United States Patent
Coles

(10) Patent No.: US 9,926,802 B2
(45) Date of Patent: Mar. 27, 2018

(54) ACCESS PORT FOR A CASING OF A GAS TURBINE ENGINE AND PLUG FOR PLUGGING THE ACCESS PORT

(71) Applicant: ROLLS-ROYCE plc, London (GB)

(72) Inventor: David Coles, Derby (GB)

(73) Assignee: ROLLS-ROYCE plc, London (GB)

( * ) Notice: Subject to any disclaimer, the term of this patent is extended or adjusted under 35 U.S.C. 154(b) by 307 days.

(21) Appl. No.: 15/003,440

(22) Filed: Jan. 21, 2016

(65) Prior Publication Data

US 2016/0237846 A1 Aug. 18, 2016

(30) Foreign Application Priority Data

Feb. 12, 2015 (GB) .................................. 1502327.8

(51) Int. Cl.
*F01D 21/00* (2006.01)
*F01D 25/24* (2006.01)
*G02B 23/24* (2006.01)

(52) U.S. Cl.
CPC ....... *F01D 21/003* (2013.01); *G02B 23/2492* (2013.01); *F05D 2260/83* (2013.01)

(58) Field of Classification Search
CPC .... F01D 21/003; F01D 25/24; F05D 2220/32; F05D 2240/55; F05D 2260/80; F05D 2260/83; G02B 23/2492
See application file for complete search history.

(56) References Cited

U.S. PATENT DOCUMENTS

| 4,825,642 A * | 5/1989 | Radtke ................. F01D 21/003 415/118 |
| 5,079,910 A * | 1/1992 | Hirst ..................... F01D 21/003 415/118 |
| 5,115,636 A * | 5/1992 | Zeiser .................. F01D 21/003 415/118 |
| 5,152,662 A * | 10/1992 | Hirst ..................... F01D 21/003 415/118 |
| 5,867,976 A * | 2/1999 | Ziegler, Jr. ........... F01D 21/003 415/118 |
| 9,046,003 B2 * | 6/2015 | Twell .................... F01D 21/003 |
| 9,708,933 B2 * | 7/2017 | Petty ....................... F01D 25/24 |
| 9,765,649 B2 * | 9/2017 | Snyder ................. F01D 25/285 |
| 2014/0056666 A1 | 2/2014 | Marc |
| 2016/0194976 A1 * | 7/2016 | Smith .................. F01D 21/003 415/118 |
| 2017/0175569 A1 * | 6/2017 | Rawson ............... F01D 25/002 |

OTHER PUBLICATIONS

Jul. 21, 2015 Search Report issued in British Patent Application No. GB1502327.8.

* cited by examiner

*Primary Examiner* — Igor Kershteyn
(74) *Attorney, Agent, or Firm* — Oliff PLC

(57) ABSTRACT

There is disclosed an access port for a casing of a gas turbine engine and a plug for plugging the access port. The access port and plug each include first and second baulking formations which are configured to engage with one another. The first and second baulking formations are spaced from one another by a unique angular separation which allows only the correct plug to be inserted into the correct access port.

16 Claims, 3 Drawing Sheets

ACCESS PORT FOR A CASING OF A GAS TURBINE ENGINE AND PLUG FOR PLUGGING THE ACCESS PORT

The disclosure relates to an access port for a casing of a gas turbine engine and a plug for plugging the access port.

The casing of a gas turbine engine is provided with a plurality of access ports, typically of approximately a centimeter in diameter. The ports may be used to inspect the interior of the engine while it is in-situ. This allows engines to be monitored more closely, without having to take them out of service. For example, a borescope may be inserted through the access port to view components within the engine and identify any defects.

The access ports may also be used to carry out repairs. For example, damage to compressor blade tips can be blended using special equipment that uses the access ports to gain access.

To restore components to original dimensions, various build-up techniques can be used, such as welding, brazing, metal spraying and electroplating.

As the access ports provide access to the gas path, it is essential that they are sealed properly. Accordingly, the access ports may be sealed using plugs which are screwed into the access ports.

Various plug designs are known which are suitable for sealing an access port. These typically include a bolt having a threaded shank and a base plate located on the shank and rotatable relative thereto. A mechanism may be provided between the shank and the base plate to ensure that the plug is not overtightened and/or unintentionally loosened (e.g. by vibration).

For example, U.S. Pat. No. 8,840,348 describes an arrangement in which a ring is received over the shank and is translatable along the shank. The ring is biased toward the distal end of the shank by a spring. The ring comprises a plurality of teeth which project axially from the ring. Similarly, the base plate is provided with a complementary arrangement comprising a plurality of teeth which are arranged in a circle and project axially so as to mesh with the teeth of the ring. As the plug is screwed into the casing, a lug formed on an underside of the base plate is received by a complementary hole in the casing such that further rotation of the base plate is prevented. Consequently, the shank rotates relative to the base plate, provided that sufficient torque is applied to overcome the bias applied by the spring and force the interlocking teeth over one another. Sufficient torque must also be applied in order to undo the plug and so the self-locking arrangement prevents the plug from becoming inadvertently loosened, particularly as a result of vibration.

Once the base plate is fully seated against the casing, a portion of the bolt in brought into contact with the base plate. As the base plate itself cannot be rotated, this prevents the plug from being overtightened. This prevents the plug from seizing in the casing.

U.S. Pat. No. 5,362,110 describes another known arrangement comprising a base plate which engages with the casing as the plug is screwed into the access port. In this case, the base plate is provided with a slot which engages with a lug near the access port in order to prevent further rotation of the base plate.

In general, plugs comprise a stem having one or more plug portions positioned along the length of the stem to provide a seal where the path passes through an engine casing or panel. As the path of each access port differs depending on its location within the engine, the plugs must be tailored for each access port (i.e. the plug portions must be provided at the correct radial distance for the particular path). Accordingly, it is important that the correct plug is inserted into the particular access port so as to ensure that the entire path is properly sealed.

Conventionally, this has been achieved by tapering the path so that the plugs can only fit in the correct ports. However, this compromises access to the interior of the engine making inspection and repair more difficult.

It is therefore desirable to provide an improved plug and access port design which prevents incorrect placement, without compromising the function of the access port.

According to an aspect there is provided an access port plug for plugging one of a plurality of access ports formed in a casing of a gas turbine engine, the access port plug comprising: a shank having a threaded portion which is engageable with a threaded bore of one of the plurality of access ports; a base plate which is received by the shank and rotatable relative thereto, the base plate having a first baulking formation and a second baulking formation, wherein the first and second baulking formations are configured to engage with complementary formations of one of the plurality of access ports; wherein the first and second baulking formations are spaced from one another by an angular separation which uniquely corresponds to the complementary formations of a matching access port only.

The first and second baulking formations may comprise protrusions (such as pins) or recesses (such as a grooves), or a combination thereof.

Where the first and/or second baulking formation comprise a recess, an outer surface of the base plate may be configured so as to prevent the complementary formation of the access port from being received in a position which is not within the recess. The distance of the outer surface of the base plate from the rotational axis may be greater than the distance of the first and second baulking formations for the entire 360° arc (or at least not less than this distance over a sufficient extent to receive the complementary formations).

The access port plug may further comprise a locking mechanism which is configured to bias against rotation of the plug.

The locking mechanism may be provided between the base plate and the shank.

The locking mechanism may be configured to key the base plate to the shank and to selectively allow rotation of the shank relative to the base plate when sufficient torque is applied to overcome a biasing force.

The angular separation between the first and second baulking formations may be less than 180° (in the direction of tightening). This ensures that the angular separation uniquely corresponds to the complementary formations of a matching access port only.

Where the first and second baulking formations are recesses, the access port plug may comprise first and second pairs of first and second baulking formations; the separation between the first and second baulking formations of each pair being less than 90°.

This ensures that the angular separation uniquely corresponds to the complementary formations of a matching access port only.

According to another aspect there is provided an access port formed in a casing of a gas turbine engine comprising: a threaded bore for receiving a shank of one of a plurality of access port plugs; a first baulking formation and a second baulking formation, wherein the first and second baulking formations are configured to engage with complementary formations formed on a base plate of one of the plurality of access port plugs; wherein the first and second baulking formations are spaced from one another by an angular separation which uniquely corresponds to the complementary formations of a matching access port plug only.

The first and second baulking formations may comprise protrusions or recesses, or a combination thereof.

The access port may further comprise a boss surrounding the threaded bore, the first and second baulking formations being provided on the boss.

Where the first and/or second baulking formation comprises a recess, an outer surface of the boss is configured so as to prevent the complementary formation of the access port plug from being received in a position which is not within the recess. The distance of the outer surface of the boss from the rotational axis may be greater than the distance of the first and second baulking formations for the entire 360° arc (or at least not less than this distance over a sufficient extent to receive the complementary formations).

The angular separation between the first and second baulking formations may be less than 180°. This ensures that the angular separation uniquely corresponds to the complementary formations of a matching access port only.

Where the first and second baulking formations are recesses, the access port may comprise first and second pairs of first and second baulking formations; the separation between the first and second baulking formations of each pair being less than 90°. This ensures that the angular separation uniquely corresponds to the complementary formations of a matching access port only.

According to another aspect a kit of parts comprising a plurality of access port plugs as described above is provided, wherein the angular separation between the first and second baulking formations is different for each plug.

According to another aspect there is provided a kit of parts comprising a plurality of access port plugs as described above, the plurality of access port plugs comprising a plurality of different types of plug; and the angular separation between the first and second baulking formations being different for each type of plug.

According to another aspect a gas turbine engine comprising a casing having a plurality of access ports as described above is provided, wherein the angular separation between the first and second baulking formations is different for each access port.

According to another aspect there is provided a gas turbine engine comprising a casing having a plurality of access ports as described above, the plurality of access ports comprising a plurality of different types of access port; and the angular separation between the first and second baulking formations being different for each type of access port.

For a better understanding of the disclosure, and to show more clearly how it may be carried into effect, reference will now be made, by way of example, to the accompanying drawings, in which.

Figure 1:
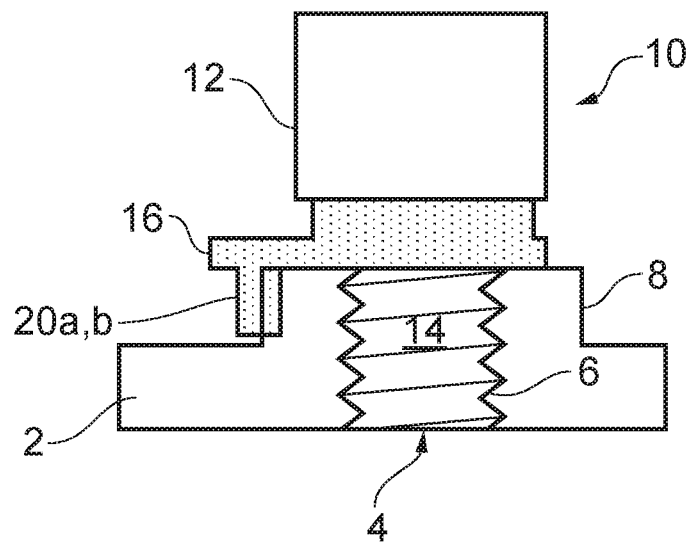
FIG. 1 is a cross-sectional side view of an access port and plug.

FIG. 1 shows a portion of an outer casing 2 of a gas turbine engine. The outer casing 2 is provided with a plurality (only one is shown) of access ports 4 which provide access to the interior of the engine for the purpose of inspection and/or repair. As shown, each access port 4 comprises a threaded bore 6 and a boss 8 which protrudes from the exterior surface of the casing 2.

A plug 10 is provided to seal the access port 4. The plug 10 is generally in the form of a bolt which comprises a head 12 and a shank 14. The head 12 comprises an internal or external drive structure (not shown), such as a hex, square or splined head or socket, which allows a tool (not shown), such as a wrench or the like, to engage and rotate the plug 10.

At least part of the shank 14 is provided with external threads to form a threaded portion which is configured to engage with the threaded bore 6 of the access port 4. Although not shown, the plug 10 may comprise a stem which extends from the shank 14 and is provided with one or more plug portions positioned along its length to provide a seal where the path passes through an engine casing or panel.

Figure 2:
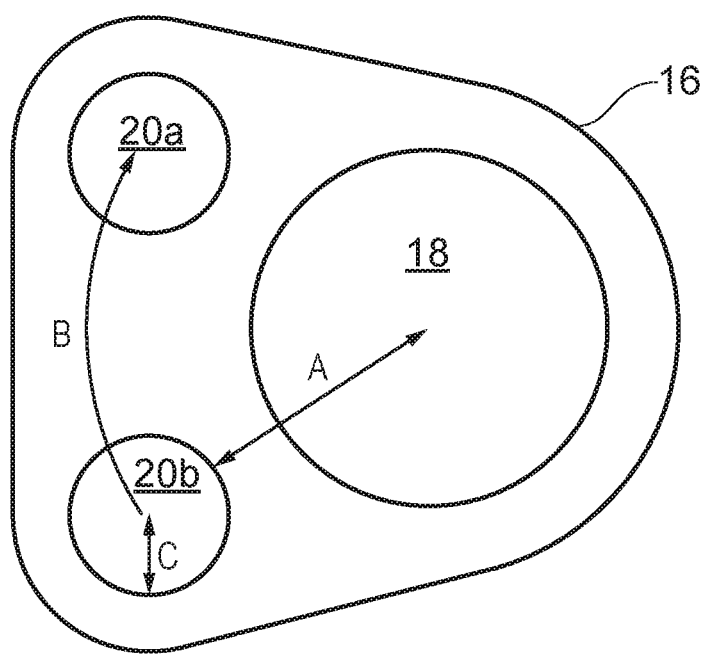
FIG. 2 is a plan view of a base plate of the plug.

The plug 10 further comprises a base plate 16 which is shown in further detail in FIG. 2. The base plate 16 has a hole 18 which receives the shank 14. The base plate 16 is held captive on an unthreaded portion of the shank 14 located between the threaded portion and the head 12. To allow this, the head 12 may be formed as a separate component which is connected to the shank 14 after the base plate 16 is installed.

The base plate 16 is freely rotatable relative to the shank 14. The base plate 16 is also allowed to translate along the length of the unthreaded portion of the shank 14. The base plate 16 further comprises a pair of pins 20a, 20b which project perpendicularly from an underside (i.e. a side facing away from the head 12) of the base plate 16. The pins 20a, 20b are each spaced radially from the centre of the hole 18 by a distance A (measured to the closest point i.e. the radially innermost surface of the pins 20a, 20b) and are spaced circumferentially from one another by a distance B. The pins 20a, 20b are cylindrical and have a radius C.

Figure 3:
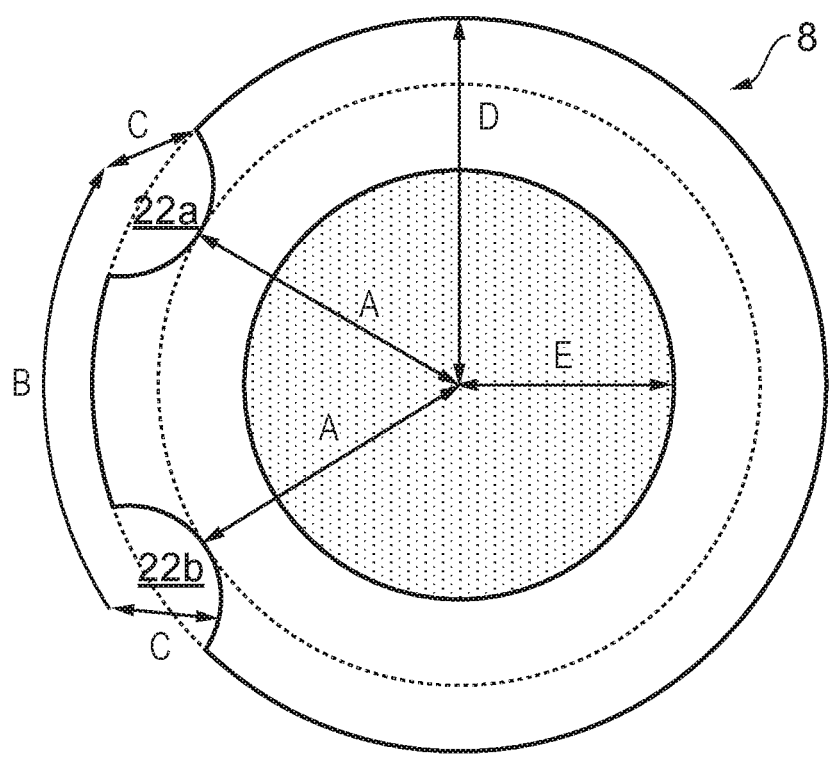
FIG. 3 is a plan view of the access port.

As shown in FIG. 3, the boss 8 of the access port 4 has a substantially circular outer surface of radius D. The outer surface is, however, provided with a pair of grooves 22a, 22b which extend axially along at least part of the length of the boss 8. As per the pins 20a, 20b, the grooves 22a, 22b are each located at a radial distance A (measured to the closest point i.e. the radially innermost surface of the grooves 22a, 22b) and are spaced circumferentially from one another by a distance B. The grooves 22a, 22b each define circular arcs of radius C. The grooves 22a, 22b are thus configured to receive the pins 20a, 20b, as will be described further below. The open nature of the grooves 22a, 22b prevents the build-up of contaminants that could otherwise prevent the pins 20a, 20b from properly engaging the boss 8.

Although not shown, a locking mechanism is provided between the base plate 16 and the shank 14. The locking mechanism is configured to key the base plate 16 to the shank 14 and to selectively allow rotation of the shank 14 relative to the base plate 16 when sufficient torque is applied to overcome a biasing force.

For example, the locking mechanism may comprise a ring which is received over the shank 14 between the base plate 16 and the head 12. The ring is keyed to the head 12 so that they rotate together. The ring is, however, allowed to axially translate relative to the head 12. A spring is provided between the head 12 and the ring so as to bias the ring away from the head 12.

The ring is provided with a plurality of teeth which project axially from an underside of the ring towards the base plate 16. Similarly, the base plate 16 is provided with a complementary arrangement comprising a plurality of teeth which are arranged in a circle and project axially so as to mesh with the teeth of the ring.

In use, the threaded portion of the plug 10 is screwed into the threaded bore 6 of the access port 4. Initially, the locking mechanism causes the base plate 16 to rotate with the shank 14.

As the base plate 16 approaches the boss 8 of the access port 4, the pins 20a, 20b are received in the grooves 22a, 22b. Accordingly, the pins 20a, 20b and grooves 22a, 22b act as anti-rotation or baulking features which prevent further rotation of the base plate 16. In order to further advance the threaded portion of the shank 14, it is therefore necessary to overcome the bias applied by the spring and force the interlocking teeth over one another. Consequently, sufficient torque must be applied in order to advance the plug 10 fully into the access port 4. Sufficient torque must also be applied in order to undo the plug 10 and so the self-locking arrangement prevents the plug 10 from becoming inadvertently loosened, particularly as a result of vibration.

The head 12 may be provided with an annular recess which receives the ring and spring. Not only does the annular recess conceal the ring and spring, it also allows the head 12 to be brought into direct contact with the base plate 16, thereby preventing overtightening of the plug 10. This prevents the plug 10 from seizing in the casing 2.

As described previously, the outer casing 2 of the engine is provided with a plurality of access ports 4. To ensure that the correct plug 10 is used in the correct port 4, the base plate 16 of each plug 10 is uniquely matched to the boss 8 of a single port 4. This is achieved by controlling the separation B between the pins 20a, 20b and the grooves 22a, 22b. The separation B is thus unique for each access port 4 within a specific engine or at least for each type of access port 4 (i.e. where the plugs 10 are identical). Consequently, each plug 10 within a set may only be properly inserted in the correct port 4. If the incorrect plug 10 is used for a particular port 4, then it will be clear that this is the case since the pins 20a, 20b will not be received by the grooves 22a, 22b such that the base plate 16 remains spaced from the boss 8.

Adjusting the separation B between the pins 20a, 20b and the grooves 22a, 22b is a straightforward process which can be easily achieved when machining the base plate 16 and the boss 8. Otherwise, the access ports 4 and plugs 10 are identical to one another and so this minor change has minimal impact on lead time and cost. The bore of the port 4 is unaffected and thus each bore can have a constant diameter through its thickness which is suitable for inspection and repair.

To ensure that the pins 20a, 20b cannot be received around the boss 8 in positions other than within the grooves 22a, 22b, it is important that the distance D of the outer surface of the boss 8 from the centre of the port 4 (the rotational axis) is greater than the distance A of the pins 20a, 20b for the entire 360° arc of the boss 8 (or at least not less than the distance A over a sufficient extent to receive the pins 20a, 20b). It will therefore be appreciated that the outer surface of the boss 8 need not be circular provided that this requirement is met.

Figure 4:
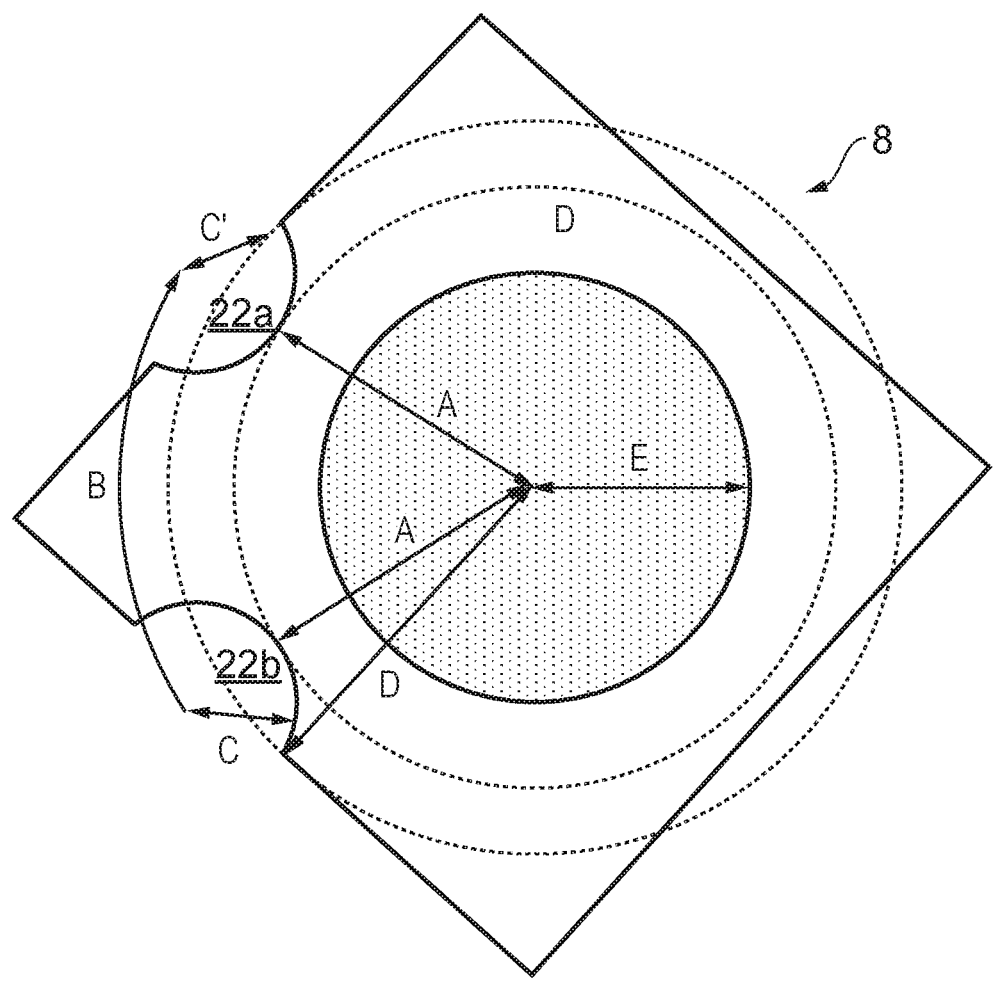
FIG. 4 is a plan view of another access port.

For example, as shown in FIG. 4, the boss 8 may have a square cross-section or any other polygon shape, provided the shape maintains a distance to the outer surface which is greater than A.

It will also be appreciated that the pins 20a, 20b (and thus the grooves 22a, 22b) need not be located at the same radial distance A, nor be of the same shape or dimensions.

It will be appreciated that the arrangement is not limited to the pins 20a, 20b and grooves 22a, 22b described previously and that other complementary anti-rotation or baulking features may be used. In particular, the pins 20a, 20b and grooves 22a, 22b may have other complementary shapes. For example, the pins 20a, 20b may have a polygonal cross-section. Further, the arrangement of the pins 20a, 20b and grooves 22a, 22b may be reversed so that the pins 20a, 20b are provided on the boss 8 and the grooves are provided on the base plate 16. Further still, the boss 8 and base plate 16 may each be provided with a pin 20a, 20b and a groove 22a, 22b which are arranged in opposite configurations so as to engage with one another.

Although a specific type of locking mechanism between the base plate 16 and the shank 14 has been described, other types of locking mechanism may be used to provide a bias against rotation of the plug 10. Indeed, in certain applications, a locking mechanism may not be required such that the base plate 16 acts as washer which ensures correct placement of the plug 10. In some locking mechanisms the base plate 16 may be coupled to the boss 8 of the access port 4, with the biasing force generated between the base plate 16 and the boss 8. With such arrangements, the base plate 16 is received by the shank 14 and then engages with part of the plug 10 to prevent relative rotation.

Where a locking mechanism is used, the separation between the pins 20a, 20b and grooves 22a, 22b (dimension B—in the direction of tightening) should be selected to ensure that proper engagement is always achieved based on the type of locking mechanism and the thread geometry. The separation between the pins 20a, 20b and grooves 22a, 22b must also ensure that other plugs cannot inadvertently achieve proper engagement. In particular, where the locking mechanism is such that the base plate 16 is independent of it, an angular separation of up to 180° may be used since the base plate 16 can be orientated so as to ensure engagement. If larger angles are used, then plugs having smaller separations may engage in the opposite configuration and thus would not provide uniqueness (i.e. if an angle of 200° is used, then a plug with a separation of 160° would also properly engage).

On the other hand, where the base plate 16 is linked to the locking mechanism (as described above), then the position at which the pins 20a, 20b come into contact with the boss 8 cannot be controlled. Accordingly, based on the thread geometry, it may be necessary to provide multiple sets of grooves 22a, 22b (which may be part of the plug 10 or port 4) so that they repeat sufficiently frequently. For example, it may be necessary for the sets of grooves 22a, 22b to repeat every 180°. In this case, to ensure that other plugs cannot inadvertently achieve proper engagement, the angular separation between the pins 20a, 20b, and grooves 22a, 22b should be kept below 90°.

Although the base plate 16 has been described as being located on an unthreaded portion of the shank 14, it may instead to located on the threaded portion and rotate relative to the shank 14 via the threaded engagement.

The grooves 22a, 22b (or pins 20a, 20b, where the arrangement is reversed) of the access port 4 may be formed directly in the casing adjacent the threaded bore 6 such that the boss 8 is not required.

While the arrangement of the access port 4 and plug 10 has been described in the context of a gas turbine engine, it may be used in other applications.

The invention claimed is:

1. An access port plug for plugging one of a plurality of access ports formed in a casing of a gas turbine engine, the access port plug comprising:
   a shank having a threaded portion which is engageable with a threaded bore of one of the plurality of access ports;
   a base plate which is received by the shank and rotatable relative thereto, the base plate having a first baulking formation and a second baulking formation, wherein the first and second baulking formations are configured to engage with complementary formations of one of the plurality of access ports;
   wherein the first and second baulking formations are spaced from one another by an angular separation which uniquely corresponds to the complementary formations of a matching access port only.

2. An access port plug as claimed in claim 1, wherein the first and second baulking formations comprise protrusions or recesses, or a combination thereof.

3. An access port plug as claimed in claim 2, wherein the first and/or second baulking formation comprises a recess; and wherein an outer surface of the base plate is configured so as to prevent the complementary formation of the access port from being received in a position which is not within the recess.

4. An access port plug as claimed in claim 1, further comprising a locking mechanism which is configured to bias against rotation of the plug.

5. An access port plug as claimed in claim 4, wherein the locking mechanism is provided between the base plate and the shank.

6. An access port plug as claimed in claim 5, wherein the locking mechanism is configured to key the base plate to the shank and to selectively allow rotation of the shank relative to the base plate when sufficient torque is applied to overcome a biasing force.

7. An access port plug as claimed in claim 1, wherein the angular separation between the first and second baulking formations is less than 180°.

8. An access port plug as claimed in claim 1, wherein the first and second baulking formations are recesses; wherein the access port plug comprises first and second pairs of first and second baulking formations; and wherein the separation between the first and second baulking formations of each pair is less than 90°.

9. A kit of parts comprising a plurality of access port plugs as claimed in claim 1, wherein the angular separation between the first and second baulking formations is different for each plug.

10. An access port formed in a casing of a gas turbine engine comprising:
    a threaded bore for receiving a shank of one of a plurality of access port plugs;
    a first baulking formation and a second baulking formation, wherein the first and second baulking formations are configured to engage with complementary formations formed on a base plate of one of the plurality of access port plugs;
    wherein the first and second baulking formations are spaced from one another by an angular separation which uniquely corresponds to the complementary formations of a matching access port plug only.

11. An access port as claimed in claim 10, wherein the first and second baulking formations comprise protrusions or recesses, or a combination thereof.

12. An access port as claimed in claim 10, further comprising a boss surrounding the threaded bore, the first and second baulking formations being provided on the boss.

13. An access plug as claimed in claim 12, wherein the first and/or second baulking formation comprises a recess; and wherein an outer surface of the boss is configured so as to prevent the complementary formation of the access port plug from being received in a position which is not within the recess.

14. An access port plug as claimed in claim 10, wherein the angular separation between the first and second baulking formations is less than 180°.

15. An access port as claimed in claim 10, wherein the first and second baulking formations are recesses; wherein the access port comprises first and second pairs of first and second baulking formations; and wherein the separation between the first and second baulking formations of each pair is less than 90°.

16. A gas turbine engine comprising a casing having a plurality of access ports as claimed in claim 11, wherein the angular separation between the first and second baulking formations is different for each access port.

* * * * *